United States Patent Office 3,089,748
Patented May 14, 1963

3,089,748
METHOD OF PRODUCING POLYACRYLONITRILE FILAMENTARY MATERIAL
Allan O. Mogensen, South Norwalk, Conn., and Robert J. Stevens, Springfield, Mass., assignors to American Cyanamid Company, New York, N.Y., a corporation of Maine
No Drawing. Filed Apr. 29, 1960, Ser. No. 25,512
9 Claims. (Cl. 8—115.5)

This invention relates broadly to the art of producing filamentary polyacrylonitrile, and more particularly is concerned with certain new and useful improvements in a wet-spinning method that includes the step of heat-relaxing an oriented, dried, polyacrylonitrile, filamentary material having a collapsed structure. Still more particularly, the present invention comprises the improvement which consists in bringing into contact (e.g., by immersion) with the aforesaid filamentary material an acidic fluid medium comprising water (in liquid and/or vapor state) and a reducing agent comprised of an oxygen-containing compound of sulfur (e.g., sodium or other alkali-metal metabisulfite) under certain particular and critical conditions of time and temperature. The contact or treatment is effected while the fluid medium is at a temperature above 100° C., and preferably at least about 105° C., but not higher than 160° C., and the period of the said contact is from 1 to 60 minutes. The contact between the filamentary material and the fluid medium is effected not later than the step of heat-relaxing the oriented, dried, polyacrylonitrile filamentary material. Thus, it may be effected immediately prior to the step of heat-relaxing, or it may be effected concurrently with the step of heat-relaxing the filamentary material at a temperature above 100° C. but not higher than 160° C.

Various methods of producing filaments, films and other shaped articles from homopolymeric acrylonitrile and from copolymers of a major proportion of acrylonitrile and a minor proportion of another monomer or monomers heretofore have been suggested. Thus, in Rein U.S. Patent No. 2,140,921, dated December 20, 1938, it is proposed that various polyvinyl compounds including polyacrylonitrile and copolymers of acrylonitrile with another vinyl compound be dissolved in concentrated aqueous solutions of inorganic (metal) salts, e.g., the chlorides, bromides, iodides, thiocyanates, perchlorates and nitrates, and that the resulting solutions be used in the manufacture of threads, films, etc. Similar solutions are used by Cresswell, as well as a low-temperature, coagulating bath, in the process disclosed and claimed in, for instance, U.S. Patent No. 2,558,330, dated July 3, 1951, and others. Various organic solvent solutions of polyacrylonitrile and copolymers of at least 85% by weight of acrylonitrile with another monomer are disclosed in Latham U.S. Patent 2,404,714; Rogers U.S. Patent 2,404,715 and –725; Hansley U.S. Patent 2,404,716; Houtz U.S. Patents 2,404,713–722, –724 and –727; Merner U.S. Patent 2,404,723; Charch U.S. Patent 2,404,726; and Finzel U.S. Patent 2,404,728, all dated July 23, 1946, and also the use of such solutions in forming films, filaments, etc., therefrom.

Although process such as are described briefly above and more fully in the aforementioned patents are, for the most part, operative and satisfactory in forming useful filamentary materials from homopolymeric and many different copolymeric acrylonitriles, processing improvements are often necessary in order to develop optimum properties in the product and/or to reduce its manufacturing cost. For example, in Hare et al. U.S. Patent No. 2,677,590 and in Moody U.S. Patent No. 2,677,591 are described processes for rendering substantially non-porous a porous, filamentary, polyacrylonitrile article which, in the latter state, has inferior properties.

The problems encountered by Hare et al. and Moody when using a spinning solution comprised of a polymer of acrylonitrile dissolved in an organic solvent are generally non-existent when using a spinning solution comprised of an acrylonitrile polymer dissolved in a concentrated aqueous solution of a water-soluble salt which yields highly hydrated ions in an aqueous solution, e.g., a thiocyanate and specifically sodium thiocyanate; and extruding this solution into a cold (not exceeding +10° C.) aqueous coagulating bath comprised of water alone or having dissolved therein from, for example, about 3% to about 20% by weight thereof of the same salt used in making the solvent for the acrylonitrile polymer, e.g., sodium thiocyanate. However, there does exist the same problem of collapsing the structure of the filamentary polyacrylonitrile in gel (specifically aquagel or hydrogel) state to a dense, compact solid while simultaneously removing the liquid phase (specifically water) therefrom. This problem of densifying or collapsing the structure was solved in a different way by Robertson and Klausner, namely, as disclosed and claimed in their copending application Serial No. 755,020, filed August 14, 1958, now Patent No. 2,984,912, dated May 23, 1961, which application is assigned to a common assignee with that of the instant case. The invention of Robertson and Klausner is based on their discovery that the structure of gelled, filamentary material comprised of water and an acrylonitrile polymer containing a major proportion by weight of combined acrylonitrile can be affectively and economically collapsed, and substantially uniform products of improved properties (e.g., better and more uniform dye receptivity, better abrasion resistance and "hand," less tendency to fibrillate, etc.) can be obtained by drying the said filamentary material under particular and critical correlated conditions of temperature and humidity.

Further improvement in the properties of an oriented, dried, polyacrylonitrile, filamentary material can be secured by heating it in a relaxed state (so-called "heat-relaxing") in an atmosphere of steam at a temperature above 100° C., preferably at least 105° C., but not higher than 160° C. For instance, in the copending application of Yoshimasa Fujita, Takeshi Okazaki and Keijiro Kuratani, Serial No. 25,783, filed concurrently herewith and assigned to a common assignee with that of the instant application, now abandoned in favor of copending application Serial No. 50,440, filed August 18, 1960, there is disclosed and claimed the method of improving the quality of fibers which have been hot-stretched (i.e., oriented by stretching while hot) and which are comprised essentially of an acrylonitrile polymer, which method comprises drying the said fibers under definite conditions of temperature and humidity to collapse their structure and make them dense, and thereafter treating the fibers in a relaxed state in an atmosphere of steam at an elevated temperature ranging from 105° C. to 160° C.

Another method of improving the properties of oriented, dried, polyacrylonitrile, filamentary material and which involves a steam treatment is disclosed in Schaefer et al. Patent No. 2,920,934, dated January 12, 1960. To obtain acrylonitrile polymer structures, specifically fibers or filaments, which are said not to fibrillate or to fibrillate to a negligible degree, it is suggested that the acrylonitrile polymer structure be subjected to a high temperature and pressure in the presence of saturated or wet steam. A tow or bundle of filaments is placed in an autoclave or other closed chamber, after which the apparatus is evacuated. Wet steam is introduced until a pressure of 30 to 60 p.s.i. is attained in the autoclave. Immediately upon reaching the desired pressure, the chamber is vented and again evacuated. Thereafter, the vacuum in the chamber is broken and the filamentary material (e.g., tow or staple fibers) is removed therefrom. This wet-steam treating cycle is repeated as desired or as may be required. The process requires evacuation of the autoclave or other pressure equipment employed in order to reduce the color which tends to develop in the filamentary material during the wet-steam treatment.

The present invention is based on our discovery that filaments comprised of a polymer of acrylonitrile of the kind described in the aforementioned Patent No. 2,920,- 934 and also in, for example, the aforesaid Robertson et al. copending application Serial No. 755,020 and Fujita et al. copending application Serial No. 50,440 are improved in their useful properties by practicing the technique broadly described in the first paragraph of this specification and more fully hereafter. More particularly the invention obviates or minimizes color degradation of the oriented, dried, polyacrylonitrile filamentary material having a collapsed structure while properties such, for example, as dyeability, knot strength and fibrillation resistance are improved. Unlike the prior art exemplified by the above-mentioned Patent 2,920,934 the technique of the present invention is adaptable to a continuous process; or, if a batch operation is carried out, it avoids the necessity for evacuating the pressure-treating vessel during each cycle of operation, thereby saving time.

In the preferred embodiment of the invention wherein the treatment with the reducing agent comprising an oxygen-containing compound of sulfur is carried out concurrently with the heat-relaxation step that normally increases the fiber color, one is able to maintain the original color of the fiber substantially the same as it was before the treatment and thus avoid separate steps of bleaching and heat-relaxation.

Another advantage flowing from the invention resides in the fact that the spent treating agent can be discarded without the necessity for removal from reusable process streams.

As has been stated hereinbefore, the acidic fluid medium used in practicing the present invention comprises water, which is in liquid and/or vapor state, and a reducing agent comprised of an oxygen-containing compound of sulfur, which compound is preferably at least partly soluble in water. The reducing agent may consist of a single such oxygen-containing sulfur compound or a plurality (one, two, three or any desired number) of such compounds.

Illustrative examples of the reducing agents described broadly above that can be employed in an acidic fluid medium comprising water in carrying the present invention into effect include sulfur dioxide, the alkali-metal (e.g., sodium, potassium, etc.) bisulfites, hydrosulfites, thiosulfates, sulfurous acid (or compounds which engender sulfurous acid, e.g., alkali-metal sulfites, ethyl and other alkyl sulfites, etc.), various organic sulfinic acids, e.g., p-toluene sulfinic acid, formamidine sulfinic acid, etc. If alkali-metal sulfites, e.g., sodium sulfite or similar compounds which engender sulfurous acid, are used, the fluid medium should contain an acid, e.g., sulfuric acid, in an amount which is at least chemically equivalent to the amount of such a compound engendering sulfurous acid that is employed.

Water-soluble inorganic hydrosulfites and formaldehyde-reaction products thereof can be used, including any of the alkali-metal hydrosulfites and their formaldehyde-reaction products, ammonium hydrosulfite and its formaldehyde-reaction product, and mixtures of a water-soluble inorganic hydrosulfite and a formaldehyde-reaction product thereof. One can also use in the acidic fluid medium mixtures of a water-soluble inorganic bisulfite and a water-soluble inorganic sulfite in any proportions.

We prefer to use as the reducing agent a water-soluble inorganic bisulfite either as such, or in the form of the metabisulfite or as the hydrate. Illustrative examples of water-soluble inorganic bisulfites that can be employed are the alkali-metal bisulfites, viz., sodium, potassium, lithium, caesium and rubidium; ammonium bisulfite; etc. The corresponding metabisulfites (anhydrous form of the bisulfite) or the hydrated forms of the bisulfites just mentioned can be used, as well as compounds which engender a bisulfite, e.g., a glyoxal-sodium bisulfite addition compound, a formaldehyde-sodium bisulfite addition compound, an acetone (or other ketone)-sodium bisulfite addition compound, etc.

Other examples of oxygen-containing compounds of sulfur, including those which are soluble in water or other solvent, that are known reducing agents and which can be used in practicing the instant invention will be found in standard books on inorganic chemistry, e.g., in chapter XX, pages 542–569, of Ephraim's Inorganic Chemistry, by P. C. L. Thorne and E. R. Roberts, 4th edition, revised, published in 1943 by Oliver and Boyd Ltd., Edinburgh, Scotland (Offset Lithoprint Reproduction, 1944, Nordeman Publishing Co., Inc., 215 Fourth Avenue, New York 3, N.Y.).

The fluid medium containing the reducing agent should be acidic, i.e., it should have a pH below 7. Hence if the fluid medium containing the particular reducing agent is not normally acidic, it should be adjusted to a pH of less than 7.0 by adding an organic acid and/or an inorganic acid, illustrative examples of which are sulfuric, hydrochloric, phosphoric, pyrophosphoric, formic, acetic, oxalic, malonic, mono-, di- or tri-chloroacetic or -bromoacetic, etc.

The filamentary material which is treated in practicing the present invention is an oriented, dried, polyacrylonitrile, filamentary material. Such a filamentary material can be prepared by various methods including those set forth in the patents and copending applications mentioned hereinbefore. A preferred method involves dissolving an acrylonitrile polymer, that is, a homopolymer or copolymer of acrylonitrile, in a concentrated aqueous solution of an alkali-metal thiocyanate (e.g., sodium thiocyanate, potassium thiocyanate, lithium thiocyanate, etc.) to form a spinning solution. The concentration of the alkali-metal thiocyanate in the water in all cases is sufficiently high so that the resulting solution will dissolve the acrylonitrile polymer. In most cases the concentration of thiocyanate is substantially above 40% (e.g., from 45–50% to 50–60%) of the total weight of the solution of thiocyanate dissolved in water, the upper limit being a saturated solution of the thiocyanate in water.

In forming the gelled, polyacrylonitrile filaments, an alkali-metal thiocyanate solution of an acrylonitrile polymer of the kind described above, after filtration and de-aeration, is passed under pressure to an extrusion head and thence through the openings or orifices in a spinnerette into a liquid coagulating bath comprising an aqueous solution containing from about 3% (preferably at least about 5%) to about 20%, by weight, of an alkali-metal thiocyanate. From a practical standpoint and to simplify the recovery problem, it is desirable that the thiocyanate employed in producing the liquid coagulating bath be of the same kind as that used in forming the concentrated aqueous solution in which the acrylonitrile polymerization product is dissolved.

As the spinning solution is forced under pressure through the openings in the spinnerette it coagulates or precipitates in the form of gelled filaments upon entering the above coagulating bath. (In the preferred method, the coagulating bath is maintained at a temperature not exceeding $+10°$ C. by any suitable means, and in some cases advantageously is maintained at or below $0°$ C., e.g., at $-9°$ C. to $-0.5°$ C.). By using such a coagulating bath, coagulation takes place somewhat more gradually than when cold water alone is used as the liquid coagulant, other conditions being the same, thereby minimizing or obviating the formation of a dense skin on the surface of the individual filaments upon subsequent drying, with obvious disadvantages from the standpoint of ease of drying, greater amenability to dyeing, etc.

If desired, a water-miscible alcohol also may be incorporated into the coagulating bath along with the alkali-metal thiocyanate as is described more fully in, for instance, British Patents Nos. 732,135 and 738,759. Such alcohols include methyl, ethyl, propyl, isopropyl, n-butyl, sec.-butyl and tert.-butyl alcohols, which constitute a preferred class because of their relatively low boiling points; although one can also use the higher monohydric alcohols as well as the various polyhydric alcohols (e.g., dihydric, trihydric, etc.), these are less desirable from an economic and operating standpoint. The alcohol, if employed, generally constitutes at least 4%, e.g., from 5% to 15%, by weight of the bath.

Instead of, or in addition to, the modification which comprises incorporating an alcohol in the coagulating bath, one can also add an alcohol to the spinning solution as is described more fully in, for instance, British Patent No. 714,530.

When alcohol is a component of the spinning solution, or the coagulating bath, or both, the bath temperature may range, for instance, from −15° C. to +10° C., as in the aforementioned U.S. Patent No. 2,558,730, or at higher temperatures ranging, for example, up to 40° C. The gelled, polyacrylonitrile filamentary material obtained under these conditions is a hydrogel-alcogel product, that is, it contains both water and alcohol in the gel structure in addition to the alkali-metal thiocyanate and the polyacrylonitrile.

After emerging from the coagulating bath the extruded filamentary material may be given a cold solvent stretch, followed by washing and then hot stretching. If the initial stretch is omitted, the gelled filaments are suitably treated for the removal of thiocyanate immediately after leaving the coagulating bath. Such a treatment may take various forms, e.g., washing either in a series of troughs or while passing over a series of upper and lower serpentine rolls, the lower rolls of the series being immersed (or partly immersed) in a series of wash troughs. If serpentine washing technique be employed, the rolls over which the filaments pass during the washing step may all operate at the same peripheral speed or with each or some at a peripheral speed slightly lower than the one immediately preceding it in the series. Washing may be done with water alone at normal (e.g., 15°–30° C.) or at an elevated temperature (e.g., 35°–50° C.), or even at a reduced temperature (e.g., 1° C. up to 15° C.); or, if desired, one could use mixtures of water and an alcohol (e.g., ethanol), or other solvents. If desired, a series of countercurrent wash troughs or vessels can be used, or any other suitable washing devices.

After washing, the gelled, polyacrylonitrile, filamentary material is hot-stretched, e.g., between rolls (or series of rolls) the latter of which are operated at a higher peripheral speed than the former. This stretch is effected while the gelled material is in contact with moisture and at a temperature within the range of about 70° C. to about 110° C., preferably while it is in contact with water at a temperature of about 70° C. to about 100° C. When temperatures above 100° C. are to be employed, the medium may be steam or hot water under superatmospheric pressure. Good results are obtained when the aqueous fluid medium in which the gelled, filamentary material is stretched is water within the range of about 90° C. to about 100° C. The degree of stretch may be widely varied but generally is from three to fifteen times the length of the unstretched material. If the freshly extruded, gelled filaments have been given a cold, solvent stretch (e.g., as is more fully disclosed in the copending application of P. W. Cummings Jr., Serial No. 554,155, filed December 20, 1955, now Patent No. 2,948,581, dated August 9, 1960), then the washed, filamentary material (or filamentary material which has been otherwise treated for the removal of thiocyanate) is generally stretched to between one and one-half and ten times its once-stretched length, the second stretch being correlated with the first stretch so that the total stretch is to from three to fifteen times the length of the said filamentary material immediately before the first stretch.

After being hot-stretched, the filamentary material may be rinsed if desired with, for example, water. Such a rinsing operation, however, is optional and may be omitted.

Following the rinsing step (if applied to the gelled material) the gelled filaments are preferably dried under the temperature and humidity conditions disclosed and claimed in the aforementioned Robertson et al. copending application Serial No. 755,020, thereby to collapse the structure of the fiber and to improve its useful properties.

The polyacrylonitrile filamentary material after being dried or otherwise treated to collapse its structure ordinarily is next processed in accordance with the improvement of the present invention. This may take one of two general forms: (A) The polyacrylonitrile filaments are treated, as by immersion, with an acidic fluid medium comprising water and a reducing agent of the kind above set forth, followed by a separate step of heat-relaxing at a temperature above 100° C., preferably at least about 105° C., but not higher than 160° C. Or, (B), the polyacrylonitrile filaments are treated with an acidic fluid medium comprising water and the aforementioned reducing agent concurrently with the step of heat-relaxing the filamentary material at a temperature above 100° C. but not higher than 160° C.

In practicing step (A) the treating temperature of the fluid medium while it is in contact with the polyacrylonitrile filamentary material ordinarily is within the range of from about 15° or 20° C. up to 100° C. It may be down to almost 0° C. Generally, the treatment is effected at room temperature (20°–30° C.).

The amount of reducing agent employed may be considerably varied but usually it is within the range of, by weight, from 0.1% to 5% of the weight of the "bone-dry" polyacrylonitrile filamentary material. The ratio of the acidic fluid medium to the polyacrylonitrile filamentary material also may be considerably varied but generally is, by weight, at least 1:1 and may range, for example, from 1.5:1 to 20:1 or higher.

The time of the treatment usually is within the range of from 1 minute (about 1 minute) to 60 minutes (about 60 minutes). The time should be sufficient to permit the acidic fluid medium to contact the filamentary material substantially uniformly throughout. In some cases, as with monofilaments or with threads, strands or tows of relatively small diameter, a period of less than 1 minute may be effective; or in other cases, e.g., with larger tows where penetration may sometimes be slow, periods of longer than 60 minutes may sometimes be necessary or desirable.

Prior to the treatment described under (A), supra, the fluid medium is rendered acidic, as was described earlier herein, if it was not already acidic upon adding the reducing agent thereto.

In accordance with the aforementioned procedure (A), the treated filamentary material is then heat-relaxed at a temperature above 100° C., preferably at least about 105° C., but not higher than 160° C. This heat-relaxation step can be carried out as described in, for instance, the aforementioned copending application of Fujita et al. Serial No. 25,783, filed concurrently herewith, now abandoned in favor of co-pending application Serial No. 50,440, filed August 18, 1960. A brief description of this step has been given earlier herein. Or, it may be effected in apparatus and following the procedure described in the copending application of Mario Sonnino, Serial No. 25,-

782, also filed concurrently herewith. Another alternative method is that described in the aforementioned Schaefer et al. Patent No. 2,920,934, using a temperature above 100° C. but not higher than 160° C., or a modification of that method.

When the procedure of (B) is employed, the heat-relaxation step and the step of treatment with the acidic fluid medium comprising water (in liquid and/or vapor state) and the aforementioned reducing agent are carried out concurrently. Water and/or steam (wet or saturated steam) at a temperature above 100° C., preferably at least about 105° C., but not above 160° C. can be used. The time and other conditions are the same as previously have been set forth when describing the separate steps. The combined steps can be carried out batch-wise, or in a semi-continuous or continuous operation.

Good results have been obtained by introducing $SO_2$ during steam relaxation. Varying amounts of $SO_2$ can be used, e.g., from 0.01 to 0.5 pound or $SO_2$ per pound of steam.

Unobvious results flowing from the invention include a nondegradation in color concurrent with improvements in, for example, fibrillation-resistance and dye-receptivity. Improvements in fibrillation resistance are shown by improvements in, for example, knot strength and loop strength.

In order that those skilled in the art better may understand how the present invention can be carried into effect, the following examples are given by way of illustration and not by way of limitation. All parts and percentages are by weight.

*Example 1*

A terpolymer is made from a monomeric mixture of 84% acrylonitrile, 8% vinyl acetate and 8% 2-methyl-5-vinylpyridine by polymerizing in an aqueous medium with an oxidation-reduction catalyst system comprising of chloric acid and sulfurous acid by known methods, e.g., as described in Cresswell U.S. Patent No. 2,751,374, dated June 19, 1956. This polymer is washed with water, ammonia, and water, and then dissolved in 47% aqueous sodium thiocyanate to make a solution containing about 10% polymer solids. After deaeration and filtration the polymer solution is preheated and then extruded through a spinnerette having 2086 holes of 65 microns diameter at a rate calculated to yield fiber of 2.0 denier/filament at a stretched speed of 120 meters/min. The extruded solution is coagulated in a bath containing 10% aqueous sodium thiocyanate at 0° C. The resulting fiber is cold-stretched 2.64 times, washed, relaxed 1%, treated with ammonia as taught in U.S. Patent 2,916,348, hot- (98–100° C.) stretched, then dried on a moving belt for 15 minutes at 220° F. dry-bulb and 160° F. wet-bulb conditions, yielding a polyacrylonitrile filamentary material having a collapsed structure. This material is then subjected to treatment with various chemical agents listed hereinafter.

The procedure is as follows:

*a.* Soak two 25 gram skeins of dry, conditioned fiber in 1000 ml. of aqueous solution of chemical to be tested for 15–30 minutes.

*b.* Steam relax samples in solution for 30 minutes at 20 p.s.i.g. in laboratory sterilizer.

*c.* Wash skeins with water. Air dry.

The chemicals applied and the visual color ratings are listed below:

Agent:          Appearance of fiber after relaxation
- Water (blank) ------------------------- Yellower.
- Peracetic acid, 0.4% ------------------- Yellower.
- Sodium hypochlorite, 1%, to pH 5 with acetic acid ------------------- Yellower.
- Sodium bisulfite, 1%, to pH 5 with acetic acid ------------------- Whiter.
- Acetic acid, 1% ---------------------- Yellower.
- Nitric acid, 1% ---------------------- Yellower.

*Example 2*

The procedures for preparing the polymer, spinning solution and fiber are essentially the same as those described in Example 1, with the exception that the denier is 1.9 d./f., the speed (hot-stretched) is 127 meters/min., and the stretch is 3.16-fold cold stretch, 1% relaxation after wash, while the hot stretch is 3.19-fold.

The dried fiber is treated (method A) as described in Example 1, and also alternatively (method B) as follows:

*a.* Soak two 25 gram skeins of dry, conditioned fiber in 1000 ml. of aqueous solution of chemical to be tested for 15–30 minutes.

*b.* Remove skeins and squeeze to approximately 100% moisture (BDB).

*c.* Steam relax at 20 p.s.i.g. for 30 minutes in laboratory sterilizer.

*d.* Wash skeins with water. Air dry.

In this example the fiber is evaluated by measuring the yellowness by a photospectrometer, according to well-known procedures such as described in U.S. Patent No. 2,861,864.

Agents used in this example, with typical measurements of fiber yellowness, are:

| Agent | Fiber Yellowness | |
|---|---|---|
| | Method A | Method B |
| None | 0.156 | 0.149 |
| $NH_4HSO_3$, 1% | 0.101 | 0.136 |
| $NH_4HSO_3$, 0.1% | 0.132 | 0.147 |
| $NaHSO_3$, 5% | | 0.132 |
| $NaHSO_3$, 1% | 0.129 | 0.140 |
| $NaHSO_3$, 0.1% | 0.137 | 0.163 |
| Fiber with no steam relaxation and no treatment | 0.120 | |

*Example 3*

Essentially the same as Example 2 except that a monomer charge of 86% acrylonitrile, 7.5% 2-methyl-5-vinylpyridine and 6.5% vinyl acetate is used; also, a stretch of 2.97-fold cold stretch, 4% relaxation, and 2.97-fold hot (98°–100° C.) stretch is used; and the treatment with the agent described is done on a one-pound sample of fiber in a pressure vessel (Gaston County dyeing machine) with circulation of the aqueous agent at 260° F. for 30 minutes, whereby immersion heat-relaxation is secured. The agents used, and typical indications of prevention of yellowing, are:

Agent—          Fiber yellowness
- None ---------------------------------- 0.17
- Aqueous $NaHSO_3$, 0.1% --------------- 0.13
- Aqueous $NaHSO_3$, 0.3% --------------- 0.13
- Aqueous $NaHSO_3$, 1% ----------------- 0.11
- Aqueous $SO_2$, 0.5% ------------------ 0.10

*Example 4*

Similar to Example 3 except that the monomer charge is 85.2% acrylonitrile, 6.8% 2-methyl-5-vinylpyridine and 8.0% vinyl acetate; also, the heat-relaxation, instead of being effected by water at 260° F. under pressure with or without an agent to prevent yellowing, is effected in an autoclave by saturated steam at 260° F. alternating with cycles of vacuum and admission of small amounts of $SO_2$ vapor.

Details of this treatment, with typical results, are:

Treatment—          Fiber yellowness
- No $SO_2$ vapor during relaxation ---------- 0.150
- $SO_2$ vapor, 14.5″ Hg absolute ------------ 0.101
- $SO_2$ vapor, 7.5″ Hg absolute ------------- 0.101
- $SO_2$ vapor, 3.5″ Hg absolute ------------- 0.096
- $SO_2$ vapor, 2.5″ Hg absolute ------------- 0.103
- $SO_2$ vapor, 1.5″ Hg absolute ------------- 0.122
- $SO_2$ vapor, 0.5″ Hg absolute ------------- 0.149
- No relaxation ----------------------------- 0.099

It will be noted that the yellowing due to the relaxation heat-treatment is prevented by the treatment with SO₂.

*Example 5*

Similar to Example 4 except that the pressure chamber used is a Turbo FS–60 steam setter (manufactured by Turbo Machine Co., Lansdale, Pennsylvania).

| Treatment: | Fiber yellowness |
|---|---|
| No relaxation | 0.091 |
| Relaxation, no SO₂ present | 0.142 |
| Relaxation, SO₂, 2.5″ Hg absolute | 0.083 |

The products of each and all of Examples 1 through 5 wherein the polyacrylonitrile filamentary material is treated with an acidic fluid medium comprising water and a reducing agent comprising an oxygen-containing compound of sulfur are improved both in color and, also, in fibrillation resistance and dye-receptivity by the combination of the treatment with the aforementioned acidic fluid medium and the heat-relaxing step, as compared with the same polyacrylonitrile filamentary material having a collapsed structure that has merely been heat relaxed. These results were entirely unobvious and in no way could have been predicted, particularly in view of the fact that other agents that have been used or suggested for use in bleaching polyacrylonitrile and other filaments, e.g., solutions of sodium hypochlorite and nitric acid, have no beneficial effect on the color of the heat-relaxed fiber (see Example 1).

Instead of the filamentary copolymer of acrylonitrile, vinyl acetate and 2-methyl-5-vinylpyridine employed in Examples 1 through 5 there can be used, in making the filaments, homopolymeric acrylonitrile or, for example, one of the following acrylonitrile copolymers:

95% acrylonitrile and 5% 2-vinylpyridine
92% acrylonitrile and 8% 2-methyl-5-vinylpyridine
95% acrylonitrile and 5% 2-vinyl-5-ethylpyridine
85% acrylonitrile, 7.5% methyl acrylate and 7.5% 2-vinylpyridine
84% acrylonitrile, 8% acrylamide and 8% 2-methyl-5-vinylpyridine
90% acrylonitrile, 5% hydroxyethyl methacrylate and 5% 2-methyl-5-vinylpyridine
86% acrylonitrile, 7% allyl alcohol and 7% 2-vinyl-5-ethylpyridine (or 7% 2-methyl-5-vinylpyridine)

One can also use any of the following copolymer compositions:

95% acrylonitrile and 5% vinyl acetate
90% acrylonitrile and 10% methyl acrylate
95% acrylonitrile and 5% acrylamide
92% acrylonitrile and 8% dimethylaminoetheyl methacrylate
90% acrylonitrile, 5% vinyl acetate and 5% methylacrylate
90% acrylonitrile, 5% methacrylonitrile and 5% vinyl acetate The foregoing copolymeric acrylonitriles are processed as described under Examples 1 through 5 with similar results.

The preferred filament-forming acrylonitrile polymers that are used in making filaments, which subsequently are treated in accordance with the present invention, are those containing, by weight, a major proportion (more than 50%) of acrylonitrile and a minor proportion (less than 50%) of a vinylpyridine combined in the polymer molecule, and especially those containing, by weight, at least 80% acrylonitrile and at least 2% of a vinylpyridine (preferably a methyl vinylpyridine including 2-methyl-5-vinylpyridine). A preferred sub-class within this broader class is that comprised of filament-forming copolymers of, by weight, from 80% to 96% acrylonitrile, from 2% to 10% of a vinylpyridine (and which preferably includes 2-methyl-5-vinylpyridine) and from 2% to 10% of a third different monoethylenically unsaturated material, e.g., vinyl esters including the formate, acetate, propionate; the various acrylic esters including the lower alkyl acrylates and methacrylates such as the methyl, ethyl and propyl acrylates and methacrylates; the various acrylamides including acrylamide itself and methacrylamide; the various acrylic acids including acrylic acid itself and methacrylic acid; methacrylonitrile and other copolymerizable substituted acrylonitriles; unsaturated alcohols including allyl alcohol; vinyl-substituted aromatic hydrocarbons, e.g., styrene, the various ring-substituted methylstyrenes; isopropenyl toluene; and others including those given by way of example in, for instance, Cresswell U.S. Patent No. 2,558,730, dated July 3, 1951 (column 3, lines 31–55), and Price U.S. Patent No. 2,736,722, dated February 28, 1956 (column 4, line 66 through line 27 in column 5). The "third different monoethylenically unsaturated material" mentioned above includes within its meaning a plurality of such materials.

Vinylpyridines which can be employed in making copolymers with acrylonitrile, and used as herein described, are vinylpyridines represented by the formula (I) 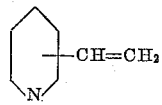

and which include 2-vinylpyridine, 3-vinylpyridine and 4-vinylpyridine; methyl vinylpyridines represented by the formula (II) 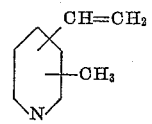

and which include 2-methyl-3-vinylpyridine, 3-vinyl-4-methylpyridine, 3 - vinyl - 5 - methylpyridine, 2-vinyl-3-methylpyridine, 2 - vinyl - 4 - methylpyridine, 2-vinyl-5-methylpyridine, 2 - vinyl-6-methylpyridine, 2-methyl-4-vinylpyridine and 3-methyl-4-vinylpyridine. The vinylpyridines embraced by Formula II are a preferred subgroup within a broader class of vinylpyridines that are advantageously employed in making copolymers which, in filamentary form, are used in practicing the present invention and which may be represented by the formula (III) 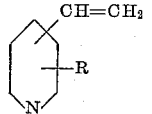

and wherein R represents a lower alkyl radical, more particularly a methyl, ethyl, propyl (including n-propyl and isopropyl) or butyl (including n-butyl, isobutyl, sec.-butyl and tert.-butyl) radical. Other examples include 2-vinyl-4,6-dimethylpyridine, the 2- and 4-vinylquinolines, 2-vinyl-4,6-diethylpyridine and others embraced by the formula (IV) 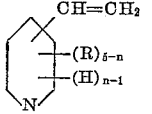

wherein R represents a lower alkyl radical, examples of which have been given hereinbefore, and n represents an integer from 1 to 5, inclusive.

One can substitute in the copolymers employed in making the filaments used in the processes of Examples 1 through 5 an equivalent amount of any of the vinylpyridines, of which numerous examples have just been given, for the specific vinylpyridine named in the individual copolymer, and then make spinning solutions from which filamentary polyacrylonitrile is produced and treated in accordance with the present invention.

When dye receptivity, especially toward acid dyes, is a matter of secondary consideration, the vinyl-pyridine can be omitted from the above-described formulations for making the copolymer.

Ordinarily, the molecular weight (average molecular weight) of the acrylonitrile homopolymer or copolymer is within the range of from about 30,000 to about 200,000, more particularly from about 40,000 to about 100,000, and still more particularly from about 60,000 to about 80,000, as calculated from a viscosity measurement of the said copolymer in dimethyl formamide using the Staudinger equation (reference: Houtz U.S. Patent No. 2,404,713, dated July 23, 1946). Acrylonitrile polymers which yield a solution having a specific viscosity at 40° C. within the range of 2 to 10 when 1 gram of the polymer is dissolved in 100 ml. of 60% aqueous sodium thiocyanate have an average molecular weight which enables the polymer to be used as a filament-forming material and such polymers can, therefore, be used in forming the spinning solutions from which are made the gelled filaments that are treated in accordance with the present invention.

The present invention is particularly concerned with an improvement in a process of producing so-called "wet-spun" polyacrylonitrile filamentary materials. The spinning solutions employed are preferably those produced by dissolving the polymer in a solvent comprising a concentrated aqueous solution of a water-soluble salt which yields highly hydrated ions in an aqueous solution. Saturated or nearly saturated aqueous solutions of such salts in some cases may be used. More specific examples of such water-soluble inorganic salts are zinc chloride, calcium chloride, lithium bromide, cadmium bromide, cadmium iodide, sodium thiocyanate, zinc thiocyanate, aluminum perchlorate, calcium perchlorate, calcium nitrate, zinc nitrate, etc. As indicated hereinbefore, the preferred salt is an alkali-metal thiocyanate, specifically sodium thiocyanate. Other examples of suitable solvents are concentrated aqueous solutions of guanidine thiocyanate, the mono-(lower alkyl)-substituted guanidine thiocyanates, and the symmetrical and unsymmetrical di-(lower alkyl)-substituted guanidine thiocyanates.

Filaments spun from organic-solvent solutions of an acrylonitrile polymer, and which are wet-spun into a coagulating bath comprising water to form the gelled filamentary material, are amenable to treatment in accordance with the present invention after their structure has been collapsed and they have been densified. In making such spinning solutions the organic solvent can be dimethyl formamide or any of the other organic solvents described in the U.S. patents mentioned in the last sentence of the second paragraph of this specification, and especially those which are soluble in or miscible with water.

The concentration of the acrylonitrile polymer in the chosen solvent should be such that a composition having a workable viscosity is obtained. This concentration will depend, for example, upon the particular solvent and extrusion apparatus employed, the diameter of the filament or other shaped article to be extruded and the average molecular weight of the polymer. The concentration may range, for example, from 6% or 7% up to 16% or 18% or more by weight of the solution. The viscosity of the solution, as determined by measuring the time in seconds for a Monel metal ball ⅛ inch in diameter to fall through 20 cm. of the solution at 61° C., may be, for instance, from 20 to 200 seconds. Usually the best spinning solutions from the standpoint of coagulation and optimum properties of the precipitated gel are those which contain the highest concentration of the acrylonitrile polymer that is consistent with solubility and viscosity characteristics. The chosen concentration may, however, require that consideration be given to other influencing factors, e.g., the optimum spinning speed for the particular production unit.

Our invention provides an economical and efficient method of improving the properties of a polyacrylonitrile filamentary material, e.g., improvements in knot strength, loop strength and loop elongation (these three different tests being a measurement of resistance to fibrillation and/or abrasion) while simultaneously preventing color degradation of the filaments. Such deterioration of color heretofore has normally occurred when a polyacrylonitrile filamentary material was subjected to a heat-relaxation treatment. Our improved technique also makes it possible to secure better penetration of dyes into the filaments; in other words, better dye-receptivity while simultaneously preventing color degradation which, if not avoided, detrimentally affects the clarity and true shade of the dyed filaments, especially in the case of light shades.

The invention is applicable to a polyacrylonitrile filamentary material in continuous filament or tow form, or in the form of staple fibers. It can be applied to crimped or uncrimped forms of such filamentary materials.

We claim:

1. In a wet-spinning method that includes the step of heat-relaxing oriented, dried, polyacrylonitrile, filamentary material having a collapsed structure, the improvement which consists in bringing into contact with said filamentary material an acidic fluid medium comprising water and a reducing agent comprised of an oxygen-containing compound of sulfur while the said fluid medium is at a temperature above 100° C. but not higher than 160° C., the contact between the said filamentary material and the said fluid medium being effected not later than the aforementioned step of heat-relaxing, and the period of the said contact being from one to sixty minutes.

2. The improvement as in claim 1 wherein the contact between the said filamentary material and the said fluid medium is effected immediately prior to the step of heat-relaxing.

3. The improvement as in claim 1 wherein the contact between the said filamentary material and the said fluid medium is effected concurrently with the step of heat-relaxing the filamentary material at a temperature above 100° C. but not higher than 160° C.

4. The improvement as in claim 1 wherein the filamentary material is immersed in an aqueous solution of an alkali-metal metabisulfite immediately prior to the step of heat-relaxing.

5. The improvement as in claim 4 wherein the alkali-metal metabisulfite is sodium metabisulfite.

6. The improvement as in claim 1 wherein the filamentary material is heat-relaxed while in contact with steam and sulfur dioxide at a temperature above 100° C. but not higher than 160° C.

7. The improvement as in claim 6 wherein there is used at least 0.01 pound of sulfur dioxide for each pound of steam.

8. The improvement as in claim 1 wherein the polyacrylonitrile filamentary material is a filament-forming copolymer of copolymerizable ingredients comprising, by weight, a major amount of acrylonitrile and a minor amount of at least one other monoethylenically unsaturated substance.

9. The improvement as in claim 1 wherein the polyacrylonitrile filamentary material is a filament-forming copolymer of copolymerizable ingredients consisting of, by weight, from 80% to 96% acrylonitrile, from 2% to 10% of a vinylpyridine, and from 2% to 10% of a third, different monoethylenically unsaturated substance.

(References on following page)

References Cited in the file of this patent

UNITED STATES PATENTS

| | | | |
|---|---|---|---|
| 2,140,921 | Rein | Dec. 20, | 1938 |
| 2,432,447 | Scheiderbauer | Dec. 9, | 1947 |
| 2,558,734 | Cresswell | July 3, | 1951 |
| 2,558,735 | Cresswell | July 3, | 1951 |
| 2,629,711 | Stanin et al. | Feb. 24, | 1953 |
| 2,677,590 | Hare et al. | May 4, | 1954 |
| 2,677,591 | Moody | May 4, | 1954 |
| 2,920,934 | Schaefer et al. | Jan. 12, | 1960 |
| 2,948,581 | Cummings | Aug. 9, | 1960 |
| 3,000,691 | Cresswell et al. | Sept. 19, | 1961 |